Nov. 17, 1925.
A. M. BATES
DUSTPROOF SHAFT CASING
Filed May 26, 1922
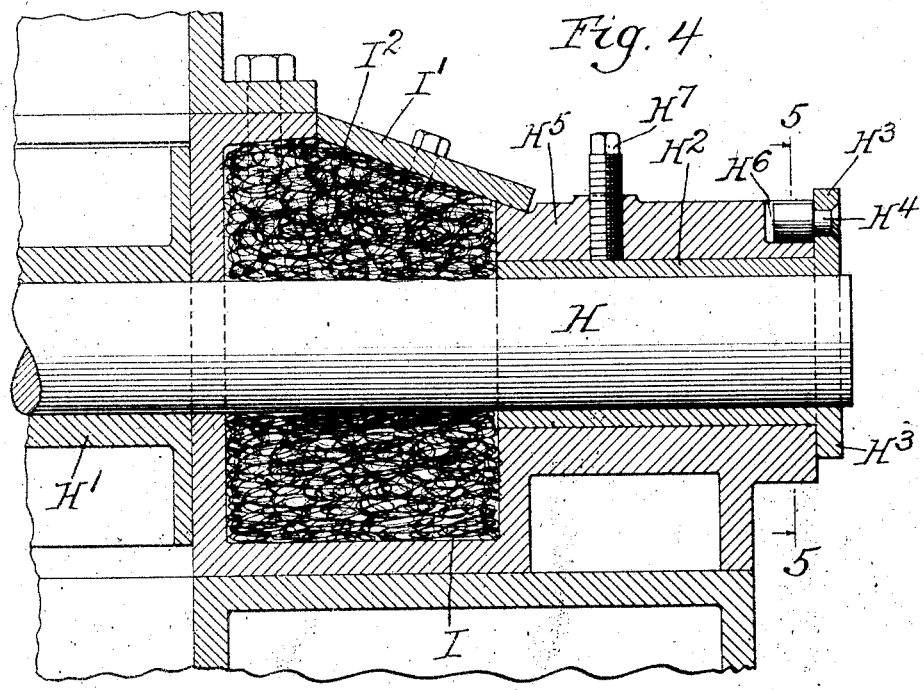
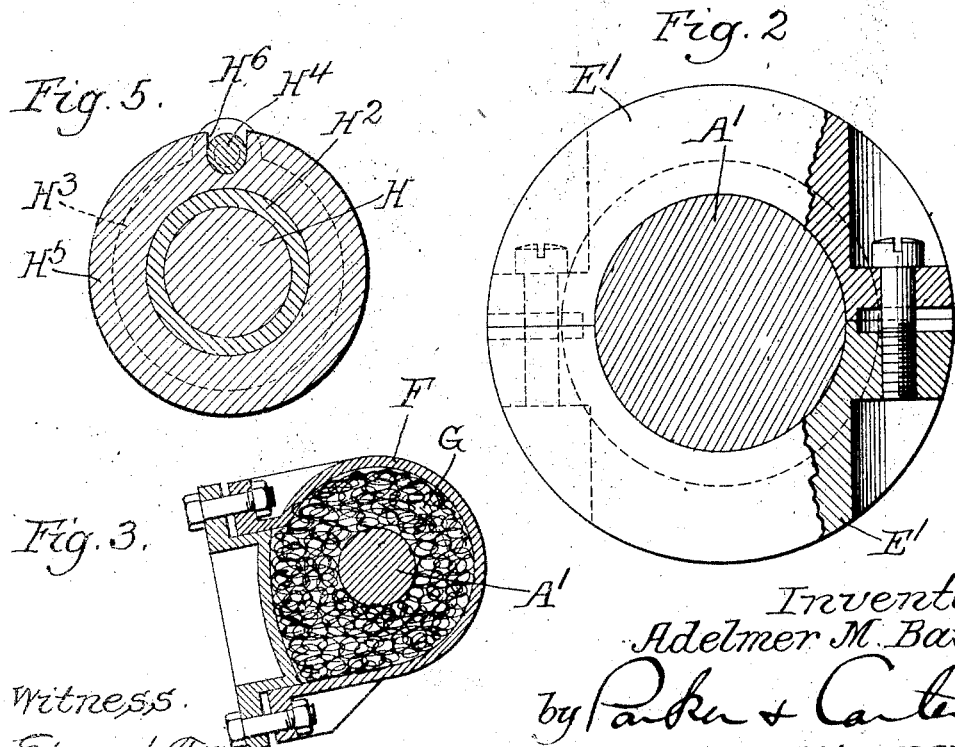
Witness
Edward T. Wray
Inventor
Adelmer M. Bates
by Parker & Carter
Attorneys Patented Nov. 17, 1925.

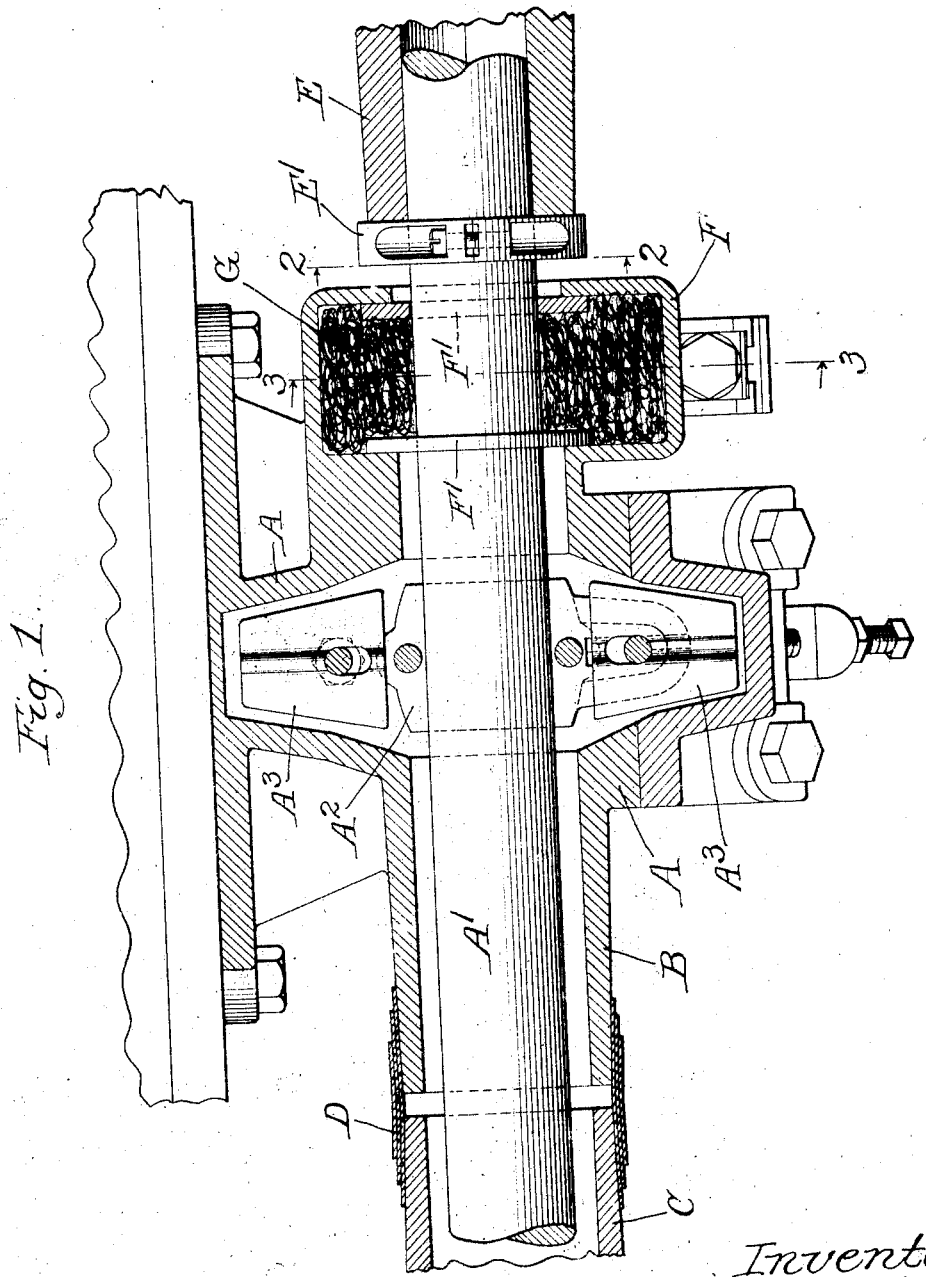

1,561,589

UNITED STATES PATENT OFFICE.

ADELMER M. BATES, OF CHICAGO, ILLINOIS, ASSIGNOR TO BATES VALVE BAG COMPANY, OF CHICAGO, ILLINOIS, A CORPORATION OF WEST VIRGINIA.

DUSTPROOF SHAFT CASING.

Application filed May 26, 1922. Serial No. 563,834.

*To all whom it may concern:*

Be it known that I, ADELMER M. BATES, a citizen of the United States, residing at Chicago, in the county of Cook and State of Illinois, have invented a certain new and useful Improvement in Dustproof Shaft Casings, of which the following is a specification.

This invention relates to apparatus for treating dusty materials, and more particularly to cement packers.

The object of the invention is to provide a casing for such apparatus, an operating shaft with its bearings outside of the casing, and means to prevent the escape of dust from the casing. More particularly, the objects are to prevent the escape of dust adjacent the bearings and to permit the use of a common operating shaft for a plurality of casings, without requiring carefully machined and fitted joints to prevent the escape of dust or exact alignment of the several casings with each other.

My invention is illustrated more or less diagrammatically in the accompanying drawings, wherein:

Figure 1 is a longitudinal section of the shaft, casing and bearing;

Figure 2 is a cross section taken on line 2—2 of Figure 1;

Figure 3 is a cross section on line 3—3 of Figure 1;

Figure 4 is a view of a modified form of the bearing;

Figure 5 is a cross section taken on line 5—5 of Figure 4.

Like parts are designated by like characters throughout.

A is a casing which forms part of a supply system whereby material, such for example as cement, is fed into packages. Running through this casing is a shaft A' upon which is mounted an impeller $A^2$ provided with blades $A^3$, $A^3$. The cement or other material is fed into the casing A and by means of the impeller is driven forward and outward through a discharge spout, not here shown, and into a receptacle. It is desirable to prevent the escape of the dusty material from the casing, except through the discharge spout, and especially desirable to prevent the escape of dust adjacent the bearings.

The casing A has at one end a lateral extension B. This extension lies close to the extension C of a similar casing. In order to prevent the escape of the cement it is important that the two casings be joined together in a dust proof joint and it is important that such a joint be easy to make and inexpensive. For this purpose there is wrapped about the two adjoining ends of the members B and C a plurality of rows of flexible tape D. This tape may be of any suitable type. It may be gummed or not, it may be painted on its outside. By means of this tape a reasonably flexible and extremely tight joint is provided and thereby the escape of material from the casing is reduced to a minimum. With this flexible joint, exact alignment of the casings is unnecessary when setting up the apparatus, and subsequent slight changes in the relative position of the casings may take place without undue strain on the connections.

At the outer end of the shaft is a bearing E. About the shaft and against the end of the bearing is tightly mounted a split collar E' which assists in excluding from the bearing any pulverized material which may have escaped from the system and be floating in the air.

In order to minimize the escape from the casing there is built about the end of the shaft adjacent the bearing a housing F, and upon the shaft on either side of the housing is mounted a laterally extending flange F', F'. These flanges bear against the inside of the housing and form tight joints. Within the housing is packed a quantity of loose curled hair G or other similar material. There is inevitably some circulation of air from the interior of the casing A past the first flange F' and into the housing F. The construction is designed to minimize this circulation of air, but some of it inevitably takes place. The material G serves as a collector and in great part collects the dust in the escaping air and prevents its further movement. The second flange F' further serves to prevent the discharge of any air and in particular to prevent the discharge of pulverized material. With this form of dust packing, it is evident that exact alignment of the casing with the shaft is not necessary in order to prevent material escape of dust.

In Figure 4 a modified form is shown in which the shaft H is carried in bearings H', H². The bearing H² is provided at one end with a laterally extending flange H³ which has in it a pin H⁴. The housing H⁵ of the bearing H² has adjacent its outer end a cavity H⁶. Within this the pin H⁴ is adapted to fit and thus the bearing is held against rotation. It is fixed against lateral movement by means of the set screws H⁷.

Between the two bearings there is provided a pocket I which has the removable cover I' which may be secured in place in any suitable manner. Within this pocket I there is packed a quantity of curled hair or other similar material I². The function of this curled hair is the same as that described above in connection with the other form of the invention and its purpose is to prevent cement or other pulverized material from coming into the bearing.

Although I have shown an operative device, it will be obvious that many changes might be made in size, shape and relation of parts without departing materially from the spirit of my invention, and I wish therefore that my showing be taken as in a sense diagrammatic.

Claims:

1. A plurality of casings enclosing apparatus for operating on dusty materials, a common operating shaft extending loosely through roughly aligned openings in said casings, substantially dust-proof joints between the adjoining casings, bearings for the shaft outside of the end casings, and dust retaining packing surrounding the shaft at the outer sides of the end casings.

2. A plurality of casings enclosing apparatus for operating on dusty materials, a common operating shaft extending loosely through roughly aligned openings in said casings, substantially dust-proof joints between the adjoining casings, and dust retaining packing surrounding the shaft at the outer sides of the end casings.

3. A plurality of casings enclosing apparatus for operating upon dusty materials, a common operating shaft extending loosely through roughly aligned openings in said casings, there being bosses surrounding the adjacent openings of the several casings, a dust-proof flexible fabric wrapping extending over the joint between each pair of adjacent bosses, and dust retaining packing surrounding the shaft at the outer side of the end casing.

4. A plurality of casings enclosing apparatus for operating upon dusty materials and arranged side by side, bosses extending towards each other from adjacent sides of said casings, there being roughly aligned openings in said bosses, a shaft extending through said openings, and a dust-proof flexible fabric wrapping extending over and surrounding the joint between each pair of adjacent bosses.

Signed at Chicago, county of Cook and State of Illinois, this 22nd day of May, 1922.

ADELMER M. BATES.